Sept. 17, 1963 P. P. GUNERATNE 3,104,215
METHOD OF EQUIPPING A NUCLEAR REACTOR FUEL
ELEMENT WITH A THERMOCOUPLE
Original Filed March 14, 1958 3 Sheets-Sheet 1

INVENTOR
PIYATILLEKE PERERA GUNERATNE
BY
ATTORNEYS

Sept. 17, 1963 P. P. GUNERATNE 3,104,215
METHOD OF EQUIPPING A NUCLEAR REACTOR FUEL
ELEMENT WITH A THERMOCOUPLE
Original Filed March 14, 1958 3 Sheets-Sheet 2

Fig. 2.

INVENTOR
PIYATILLEKE PERERA GUNERATNE

BY

ATTORNEYS

INVENTOR
PIYATILLEKE PERERA GUNERATNE

BY

ATTORNEYS

United States Patent Office 3,104,215
Patented Sept. 17, 1963

3,104,215
METHOD OF EQUIPPING A NUCLEAR REACTOR FUEL ELEMENT WITH A THERMOCOUPLE
Piyatilleke Perera Guneratne, Seascale, Cumberland, England, assignor to United Kingdom Atomic Energy Authority, London, England
Continuation of abandoned application Ser. No. 721,594, Mar. 14, 1958. This application Sept. 29, 1960, Ser. No. 59,461
Claims priority, application Great Britain Mar. 15, 1957
6 Claims. (Cl. 204—154.2)

This invention relates to nuclear reactors, and is a continuation of my abandoned application Serial No. 721,594, filed March 14, 1958.

In the operation of nuclear reactors containing solid fuel elements in the form of fuel members each within a protective sheath it is desirable to maintain a continuous check of the fuel temperature so that the approach to critical temperatures such as phase change temperatures can be guarded against. In the past fuel temperatures have been measured indirectly by attaching a thermocouple to the fuel element sheath but, owing to the very high temperature gradients existing from the center of a fuel member to its surface, the change in thermal conductivity of nuclear fuel with temperature, and temperature drop between fuel and sheath, the assessment of the fuel temperature from the sheath temperature is complicated, and may be inaccurate. It is an object of the present invention to provide a fuel element of which the fuel temperature can be measured directly.

According to the invention a fuel element for a nuclear reactor comprises a nuclear fuel member enclosed in a protective sheath having a thermocouple cable with its hot junction terminating in the fuel member, the cable being sealed in passage through the fuel element sheath.

The fuel member may be fabricated by casting or sintering and the thermocouple cable inserted during fabrication, this being preferred for uranium fuel owing to the difficulty of drilling uranium. The thermocouple conductors, conductor insulation and outer material or the cable must be able to withstand the casting or sintering technique employed. In particular, the outer material must have a higher melting point than the fuel and not alloy with it. Preferred materials for a uranium fuel member are niobium and tantalum.

Figure 1:
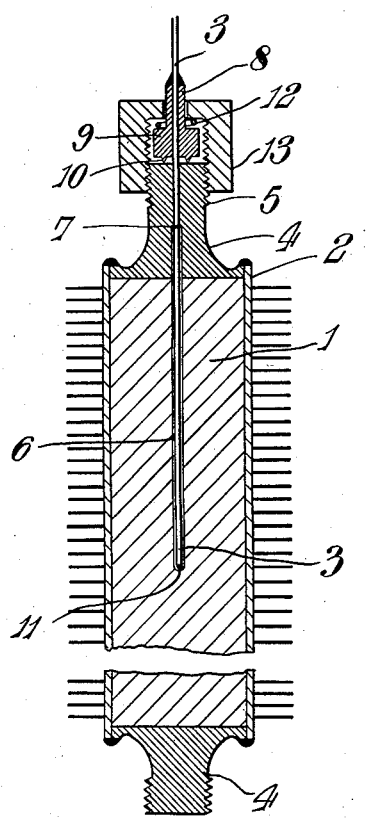
Figure 3:
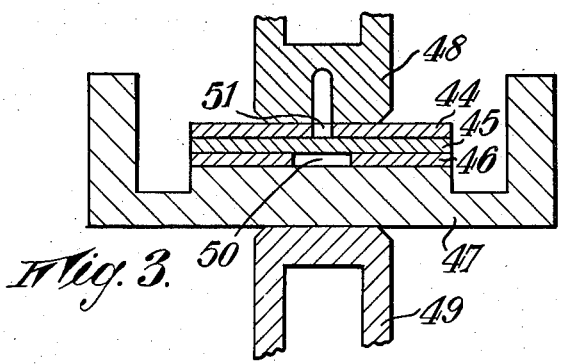
Figure 4:
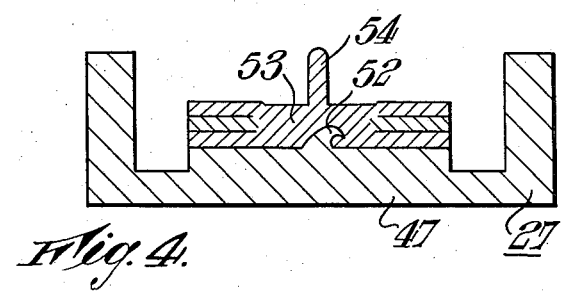
Figure 5:
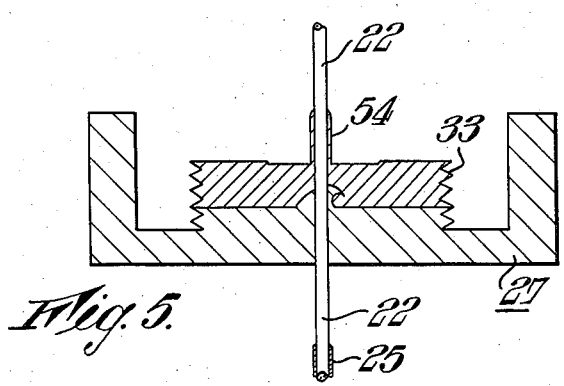

The invention will now be described with reference to the drawings wherein FIGURE 1 is a sectional view of one arrangement, FIGURE 2 is a sectional view of an alternative arrangement and FIGURES 3, 4 and 5 are sectional views showing the construction of a part of FIGURE 2.

In FIGURE 1 there is shown a uranium fuel member 1 enclosed in a finned magnesium alloy sheath 2 and a stainless steel sheathed thermocouple cable 3 inserted in the member 1. The fuel member is formed by vacuum casting uranium into an alumina lined graphite mould, the cable being supported by a graphite spider at its upper end during casting. The conductors in the cable 3 are joined together to form a hot junction 11 and a niobium covering 6 is swaged over the cable 3 from the junction 11 to a point 7 outside the fuel member 1 so that uranium does not contact the stainless steel sheath of the cable 3 when the uranium is being cast. The sheath 2 is sealed off by end caps 4 having screwed parts 5, the top one of the caps being drilled to allow passage of the cable 3. A sealing member 9 having a drilled spigot 8 and knife edges 10 is fitted over the cable 3 and a spring 12 and nut 13 are provided for pressing the sealing knife edges into contact with the screwed part 5. The spigot 8 is then welded to the cable 3 to complete the sealing of the fuel element.

In FIGURE 2 a nuclear fuel member 20 is enclosed in a finned magnesium alloy sheath 21 and provided with a stainless steel sheathed thermocouple cable 22 in a manner similar to that described above with reference to FIGURE 1. The conductors in the cable 22 are joined together to form a hot junction 24 and a niobium covering 25 is swaged over the junction 24 and cable 22 to a point 23 outside the fuel member 20 so that uranium does not contact the stainless steel sheath of the cable 22 when the uranium is cast about the cable. The alloy sheath 21 is sealed off by end caps 26, 27 and the fuel member is spaced from the end caps by heat insulating discs 28, 29, the disc 28 having a screw thread 30 and holes 31 for a spanner. The end caps have screwed bosses 32, 33 and adaptors 34, 35 are fitted on the bosses. The adaptors allow the elements to be stacked in a column. The end cap 27 is constructed as described below with reference to FIGURES 3–5 and it provides a fuzed joint sealing the cable 22 in passage through the cap 27. The adaptor 35 is made with a detachable head 36 held with screws 37 and there is provided a central hole 38 and passageway 39 so that the cable 22 can be bent back along the sheath 21. The cable 22 passes into a junction box 40 mounted on the sheath where it is met by another thermocouple cable 41 connected to a thickened part 42 of the sheath 2. The conductors of cables 22 and 41 are then connected to a 4-wire thermocouple cable 43. By arranging for the cable 22 to enter the fuel member 20 from the bottom, manipulation of fuel elements by grabbing the adaptor 34 is not hindered by the presence of a thermocouple cable as would be encountered if the cable passed through the center of the adaptor 34. The construction of the end cap 27 is now described with reference to FIGS. 3–5. In FIGURE 3 three discs of titanium 44, 45 and 46 are placed on the magnesium base 47 of the end cap and the stack is placed between water cooled welding electrodes 48, 49. The disc 46 is 0.30" thick and provided with a hole 50 of 0.20" diameter, the disc 45 is 0.20" and the disc 44 is 0.40" thick with a perforation 51 of 0.08" diameter. On passing a welding current between the electrodes of 30,000 amps with a force between the electrodes of 2,000 lbs., the cap 27 is obtained as shown in FIGURE 4. The magnesium base 47 has curled over and keyed with a tongue 52 to a central titanium mass 53 and a projection 54 of titanium is obtained. The projection 54, central mass 53 and base 47 are drilled ready for fitting over the thermocouple cable 22 to which it is brazed at the projection 54 as shown in FIGURE 5.

In the manufacture of the fuel element described in FIGURE 2 the fuel member 20 and cable 22 are made together by casting the member 20 about the cable. The fuel member is machined to size and inserted in the sheath 21, the disc 28 screwed into place and the disc 29 passed over the thermocouple cable. The cap 27 (as shown in FIGURE 5) is also passed over the cable to fit in the sheath 21 and edge welded by argon arc to the sheath 21. The cable 22 is then brazed into the projection 54. The sheath is evacuated through the disc 28 (a path being provided by leakage round the screw threads) and then helium filled. The disc 28 is tightened to make a temporary seal and the cap 26 is then edge welded by argon arc into the sheath 21. The cable 41 is fitted and passed into the box 40. The adaptor 35 is fitted with the head 36 removed and the cable 22 bent back along passageway 39 and along the fuel element to the box 40. Both cables 41 and 22 are then connected to the 4-wire cable 43. The head 36 is replaced and made fast with the screws 37.

The adaptor 34 is then fitted.

I claim:

1. A method of equipping with a thermocouple a nuclear fuel element having a uranium fuel member enclosed in a fuel element sheath, said method comprising the steps of covering a thermocouple junction and the adjacent part of its associated stainless steel-sheathed electrical cable with material from the group consisting of niobium and tantalum, fabricating a uranium fuel member about the junction and at least part of the covered cable so as to leave the uncovered part of the cable extending beyond the fuel member, enclosing the fabricated fuel member in its fuel element sheath, sealing a further member to said fuel element sheath and sealing said further member to the stainless steel of the uncovered part of the cable.

2. A method of equipping with a thermocouple a nuclear fuel element having a uranium fuel member enclosed in a fuel element sheath of material from the class consisting of magnesium and magnesium alloy, said method comprising the steps of covering a thermocouple junction and the adjacent part of its associated stainless steel-sheathed electrical cable with material from the group consisting of niobium and tantalum, fabricating a uranium fuel member about the junction and at least part of the covered cable so as to leave the uncovered part of the cable extending beyond the fuel member, enclosing the fabricated fuel member in its fuel element sheath, sealing a titanium member to said fuel element sheath and sealing said titanium member to the stainless steel of the uncovered part of the cable.

3. A method according to claim 1 wherein the fuel member is fabricated by casting.

4. A method according to claim 2 wherein the fuel member is fabricated by casting.

5. A method according to claim 1 wherein the fuel member is fabricated by sintering.

6. A method according to claim 2 wherein the fuel member is fabricated by sintering.

References Cited in the file of this patent
UNITED STATES PATENTS

| | | |
|---|---|---|
| 2,856,341 | Kanne | Oct. 14, 1958 |
| 2,885,335 | Moore et al. | May 5, 1959 |

OTHER REFERENCES

BMI-69, Jacketing of Uranium for High-Temperature Service, June 1951.

ORNL-1537, Mar. 11, 1954, pages 3 and 5. Available from OTS, Dept. of Commerce, Washington 25, D.C.

IDO-16388, Feb. 15, 1957, available from OTS, Dept. of Commerce, Washington 25, D.C.